United States Patent [19]

Divivier et al.

[11] Patent Number: 5,752,269

[45] Date of Patent: May 12, 1998

[54] PIPELINED MICROPROCESSOR THAT PIPELINES MEMORY REQUESTS TO AN EXTERNAL MEMORY

[75] Inventors: Robert J. Divivier, San Jose; Ralph Haines, Atherton; Mario D. Nemirovsky, San Jose; Alexander Perez, Sunnyvale, all of Calif.

[73] Assignee: National Semiconductor Corporation, Santa Clara, Calif.

[21] Appl. No.: 451,150

[22] Filed: May 26, 1995

[51] Int. Cl.$^6$ .................................................. G06F 12/02
[52] U.S. Cl. ........................... 711/169; 711/105; 395/800
[58] Field of Search ................................. 395/432, 496, 395/375, 800, 467

[56] References Cited

U.S. PATENT DOCUMENTS

| | | | |
|---|---|---|---|
| 5,189,319 | 2/1993 | Fung et al. | 326/86 |
| 5,204,953 | 4/1993 | Dixit | 711/211 |
| 5,239,639 | 8/1993 | Fischer et al. | 711/167 |
| 5,254,888 | 10/1993 | Lee et al. | 327/298 |
| 5,259,006 | 11/1993 | Price et al. | 375/356 |
| 5,404,473 | 4/1995 | Papworth et al. | 395/375 |
| 5,408,626 | 4/1995 | Dixit | 711/211 |
| 5,469,544 | 11/1995 | Aatresh et al. | 711/169 |
| 5,479,635 | 12/1995 | Kametani | 711/105 |
| 5,502,835 | 3/1996 | Le et al. | 711/169 |
| 5,553,270 | 9/1996 | Rosenbluth | 711/169 |

FOREIGN PATENT DOCUMENTS 0398382   11/1990   European Pat. Off. .

OTHER PUBLICATIONS

Johnson, Mike. "Superscalar Microprocessor Design", Prentice–Hall, Inc. 1991;pp. 1–7.

Hennessy, John L., and David A. Patterson, "Computer Architecture A Quantitative Approach", Morgan Kaufmann Publishers, Inc., 1990, sections 5.3, 6.1–6.3.

Journal of Supercomputing, vol. 7, No. 1/02, 1 May 1993, pp.143–180, Beck G R et al: "The Cydra 5 Minisupercomputer: Architecture and Implementation".

IEEE Journal of Solid–State Circuits, vol. 25, No. 1, 1 Feb. 1990, New York US, pp. 100–106, Kazutaka Nogami et al: "A 9–NS Hit–Delay 32–Kbyte Cache Macro for High–Speed Risc".

IEEE Micro. vol. 15, No. 2, 1 Apr. 1995, pp. 33–43, Edmondson J H et al : "Superscalar Instruction Execution in the 21164 Alpha Microprocessor".

Serra, Micaela & Dervisoglu, Bulent I, "Testing", Chapter 79, *The Electrical Engineering Handbook*, Richard C. Dorf, Editor–in–Chief, pp. 1808–1837, CRC Press.

L–T Wang et al., "Feedback Shift Registers For Self–Testing Circuits", *VLSI Systems Design*, Dec. 1986.

Masakazu Shoji, "CMOS Dynamic Gates", Chapter 5, *AT&T CMOS Digital Circuit Technology*, Prentice Hall, 1988, pp.210–257.

Guthrie, Charles, "Power–On Sequencing For Liquid Crystal Displays; Why, When, And How", *Sharp Application Notes*, Sharp Corporation, 1994, pp. 2–1 thru 2–9.

(List continued on next page.)

*Primary Examiner*—Eddie P. Chan
*Assistant Examiner*—Reginald G. Bragdon
*Attorney, Agent, or Firm*—Limbach & Limbach L.L.P.

[57] ABSTRACT

Memory requests are pipelined to an external memory by forming a memory address during the same clock cycle that the associated instruction is executed, issuing a ready signal during the clock cycle that precedes the clock cycle in which information is output from an external memory, and directing information received from the external memory to a register file during the same clock cycle that the information is received. In addition, when an instruction requires the information that was requested by the previous instruction, the information is directed to an arithmetic logic unit (ALU) during the same clock cycle that the information is received. As a result, the cycle time required to retrieve information stored in a DRAM can be substantially reduced.

18 Claims, 5 Drawing Sheets

OTHER PUBLICATIONS

Bernd Moeschen, "NS32SP160—Feature Communication Controller Architecture Specification", *National Semiconductor*, Rev. 1.0, May 13, 1993.

Agarwal, Rakesh K., *80×86 Architecture and Programming, vol. II: Architecture Reference*, Chapter 4, Prentice Hall, 1991, pp. 542–543.

Intel486 Microprocessor Family Programmer's Reference Manual, Intel Corporation, 1993.

"8237A High Performance Programmable DMA Controller (8237A, 8237A-4, 8237A-5)", *Peripheral Components*, Intel, 1992, pp. 3–14 thru 3–50.

Kane, Gerry, "R2000 Processor Programming Model", Chapter 2, *MIPS RISC Architecture*, MIPS Computer Systems, Inc.

Hennessy, John, et al., "Interpreting Memory Addresses", *Computer Architecture A Quantitative Approach*, pp. 95–97, Morgan Kaufmann Publishers, Inc. 1990.

*PowerPC601 Reference Manual*, IBM, 1994, Chapter 9, "System Interface Operation", pp. 9–15 thru 9–17.

Intel Corp. Microsoft Corp., *Advanced Power Management (APM) BIOS Interface Specification*, Revision 1.1, Sep. 1993.

Intel Corporation, *i486 Micro Processor Hardware Reference Manual*, Processor Bus, pp. 3–28 thru 3–32.

PIPELINED MICROPROCESSOR THAT PIPELINES MEMORY REQUESTS TO AN EXTERNAL MEMORY

BACKGROUND OF THE INVENTION

1. Field of the Invention

The present invention relates to pipelined microprocessors and, more particularly, to a pipelined microprocessor that pipelines memory requests to an external memory.

2. Description of the Related Art

A pipelined microprocessor is a microprocessor that operates on instructions in stages so that, at each stage of the pipeline, a different function is performed on an instruction. As a result, multiple instructions move through the pipe at the same time much like to-be-assembled products move through a multistage assembly line.

FIG. 1 shows a block diagram that illustrates the flow of an instruction through a conventional pipelined processor. As shown in FIG. 1, the first stage in the pipe is a prefetch stage. In this stage, the to-be-executed instructions are retrieved from either an instruction cache or an external memory, and are then sequentially loaded into a prefetch buffer. The purpose of the prefetch stage is to fill the prefetch buffer so that one instruction can be advanced to the decode stage, the next stage in the pipe, with each clock cycle.

In the decode stage, each instruction moving through the pipe is decoded to determine what operation is to be performed. After the decode stage, an operand stage determines if data will be needed to perform the operation and, if needed, retrieves the data from memory. Following this, the operation specified by the instruction is performed in an execution stage, while the results of the operation are stored in a write-back stage.

In the ideal case, each instruction is advanced from one stage to the next with each successive clock cycle. Thus, while it takes five clock cycles for an instruction to propagate through the pipeline, the processor appears to complete the execution of each instruction in only one clock cycle.

One situation which can stall the pipeline, or prevent instructions from advancing from one stage to the next with each clock cycle, is the inability of the processor to obtain the data required by the operand stage within a single clock cycle. As a result, conventional pipelined processors typically utilize an on-chip data cache to store the most frequently requested values. Since the data cache is on-chip, the cache can typically be accessed within a single clock cycle.

Although a data cache provides a technique for accessing memory within a single clock cycle, cache memories require a significant amount of silicon real estate to implement, and consume a substantial amount of power each time the cache is accessed. In addition, cache memories further require control logic to insure that each time the data stored in the external memory is updated, the data stored in the cache is also updated.

One solution to these problems is to eliminate the data cache and only utilize the external memory. The primary drawback to this solution, however, is that it takes two to three more clock cycles to retrieve data from the external memory than it does from the cache. Thus, there is a need for a technique that allows the external memory to be accessed within a single clock cycle, thereby eliminating the need for the cache.

SUMMARY OF THE INVENTION

In the present invention, memory requests are pipelined to an external memory by forming a memory address during the same clock cycle that the associated instruction is executed, issuing an early ready signal, and directing the information received from the external memory to a register file during the same clock cycle that the information is received. In addition, when an instruction requires the information that was requested by a previous instruction, the information received from the external memory can be directed to the arithmetic logic unit (ALU) during the same clock cycle that the information is received. As a result, the cycle time required to retrieve information stored in the external memory can be substantially reduced.

A one-cycle memory access circuit in accordance with the present invention includes a pipelined processor that sequentially advances instructions through the pipe in response to the logic state of a pipeline advance signal. The pipelined processor, in turn, includes an execution stage that latches and executes decoded instructions advanced through the pipe.

When an executed instruction transfers information to or from an external memory, the execution stage forms an internal address that identifies the location in memory where the information is to be transferred to or from during the same clock cycle that the instruction is executed.

The next time the pipeline is advanced, a first write stage of the processor latches the internal address output from the execution stage as a memory address. During the same clock cycle that the memory address is output by the first write stage, a dynamic random-access-memory (DRAM) controller outputs the memory address as a DRAM address when the memory address is within an address space controlled by the DRAM controller.

When information is to be read from memory, the DRAM controller outputs a ready signal during the clock cycle prior to the clock cycle that the information is to be output. The information output onto the data bus is then latched by a second write stage of the processor. The second write stage directs the information to a register file during the same clock cycle that the information is received and, when the information is required by a next instruction, can also direct the information to the ALU in the execution stage.

The advancement of instructions through the pipe is controlled by a global controller that changes the logic state of the pipeline advance signal in response to the logic state of the ready signal when a plurality of pipeline control signals are set to predefined logic states.

A better understanding of the features and advantages of the present invention will be obtained by reference to the following detailed description and accompanying drawings which set forth an illustrative embodiment in which the principals of the invention are utilized.

DETAILED DESCRIPTION

Figure 1:
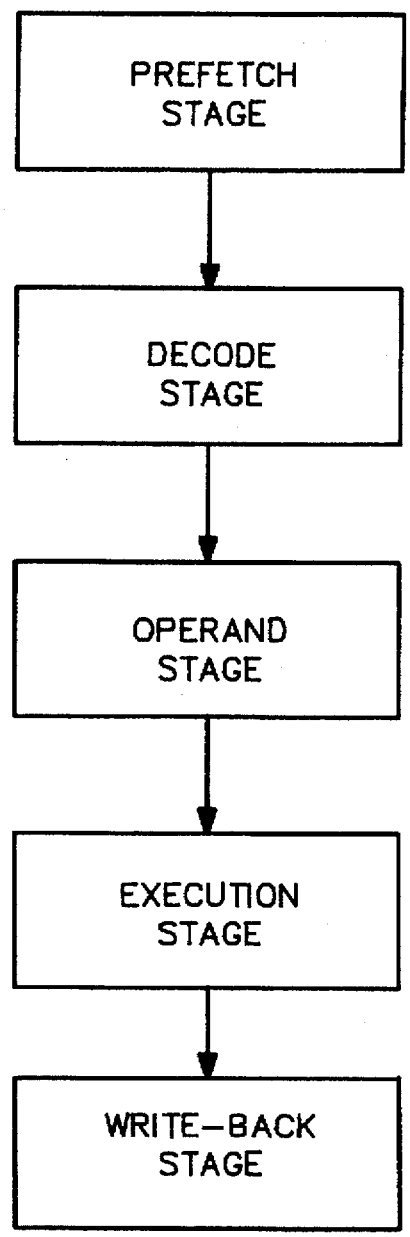
FIG. 1 is a block diagram illustrating the flow of an instruction through a conventional pipelined processor.
Figure 2:
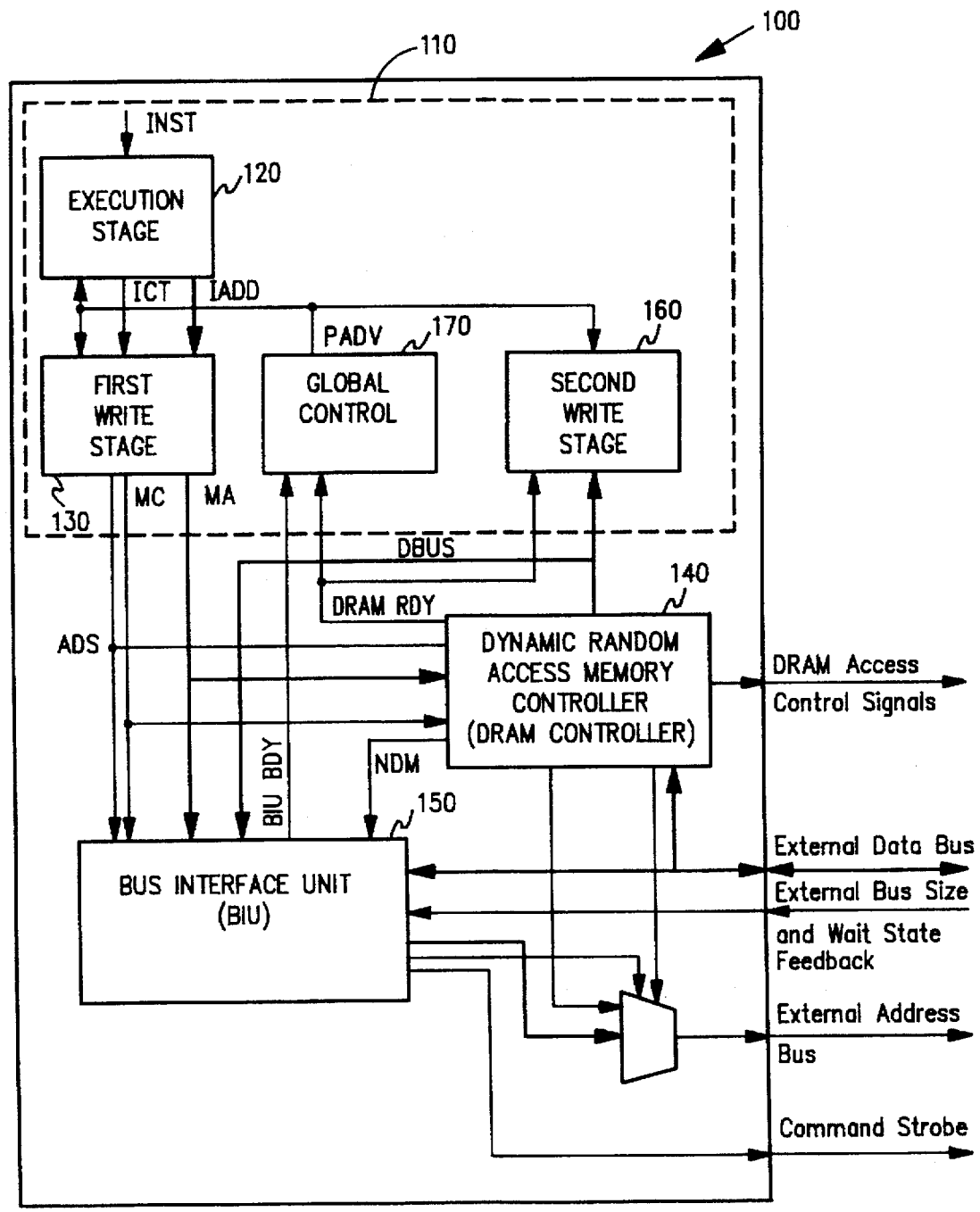
FIG. 2 is a block diagram illustrating a one cycle memory access circuit 100 in accordance with the present invention.

FIG. 2 shows a block diagram of a one-cycle memory access circuit 100 in accordance with the present invention.

As shown in FIG. 2, circuit 100 includes a pipelined microprocessor 110 that advances instructions through the pipe on the rising edge of a clock signal when a pipeline advance signal PADV, which synchronizes the movement of the instructions, is set to a predefined logic state. Microprocessor 110, in turn, includes an execution stage 120 that latches and executes instructions advanced into the stage.

In accordance with the present invention, when an instruction INST transfers information to or from a DRAM, execution stage 120 also calculates an internal address IADD, which identifies the memory location that corresponds with the instruction, before the next instruction is advanced into the stage.

At the same time, execution stage 120 also sets the logic states of a series of internal control signals ICT that define the memory request associated with the internal address IADD. For example, in the FIG. 2 embodiment, the control signals ICT include a memory/IO signal M/IO# that indicates whether the request is to memory or an I/O device, a data/code signal D/C# that indicates whether the request is for data or code, a byte high enable signal BHE# that indicates which of two bytes of information are to be accessed, a pipe mode signal PipeMd that indicates a pipeline memory access, and a write/read signal W/R# that indicates whether the request is for a read or a write.

As further shown in FIG. 2, microprocessor 110 also includes a first write stage 130 that latches and outputs the internal address IADD as a memory address MA, and the internal control signals ICT as memory control signals MC, when an internal address IADD is advanced into the stage. In addition, first write stage 130 also lowers the logic state of an address strobe ADS, which indicates that the memory address MA is valid, a delay time after a valid internal address is latched.

The memory address MA, the memory control signals MC, and the address strobe ADS are output by first write stage 130 to both a DRAM controller 140 that controls information transfers to and from a series of DRAMs, and a bus interface unit 150 that controls information transfers to and from other external devices.

In response to the memory address MA, the memory control signals MC, and the address strobe ADS, DRAM controller 140 determines whether the memory address MA falls within the address space controlled by controller 140 and, if the address is not within the address space, sets a not DRAM signal NDM to a predetermined logic state. In the FIG. 2 embodiment, BIU controller 150 can not assume control over the external address bus unless the NDM signal is set to the predetermined logic state.

On the other hand, when the memory address MA is within the DRAM address space, and the logic state of the address strobe ADS indicates that the memory address MA is valid, DRAM controller 140 writes information to or reads information from the DRAM identified by the memory address MA. In accordance with the present invention, as described in greater detail below, when information is to be output from the addressed DRAM, controller 140 outputs a ready signal RDY during the clock cycle that precedes the output of the information.

As further shown in FIG. 2, microprocessor 110 also includes a second write stage 160 that latches the information output by the addressed DRAM, and directs the information to a register file. In accordance with the present invention, when the next instruction requires the information output from the addressed DRAM, second write stage 160 also directs the information to the arithmetic logic unit (ALU) in the execution stage during the same clock cycle that the information is received from the addressed DRAM.

For example, if a move instruction, which moves information stored in a DRAM to a first register, is followed by an add instruction, which combines the information stored in the first register with the information stored in a second register, second write stage 160 directs the information from the DRAM to the ALU during the same clock cycle so that the information can be combined with the contents of the second register, thereby saving one clock cycle.

Microprocessor 110 additionally includes a global controller 170 that controls the sequencing of the pipeline. In operation, global controller 170 changes the logic state of the pipeline advance signal PADV each time a plurality of pipeline control signals, including the ready signal RDY, are set to predefined logic states.

Figure 3:
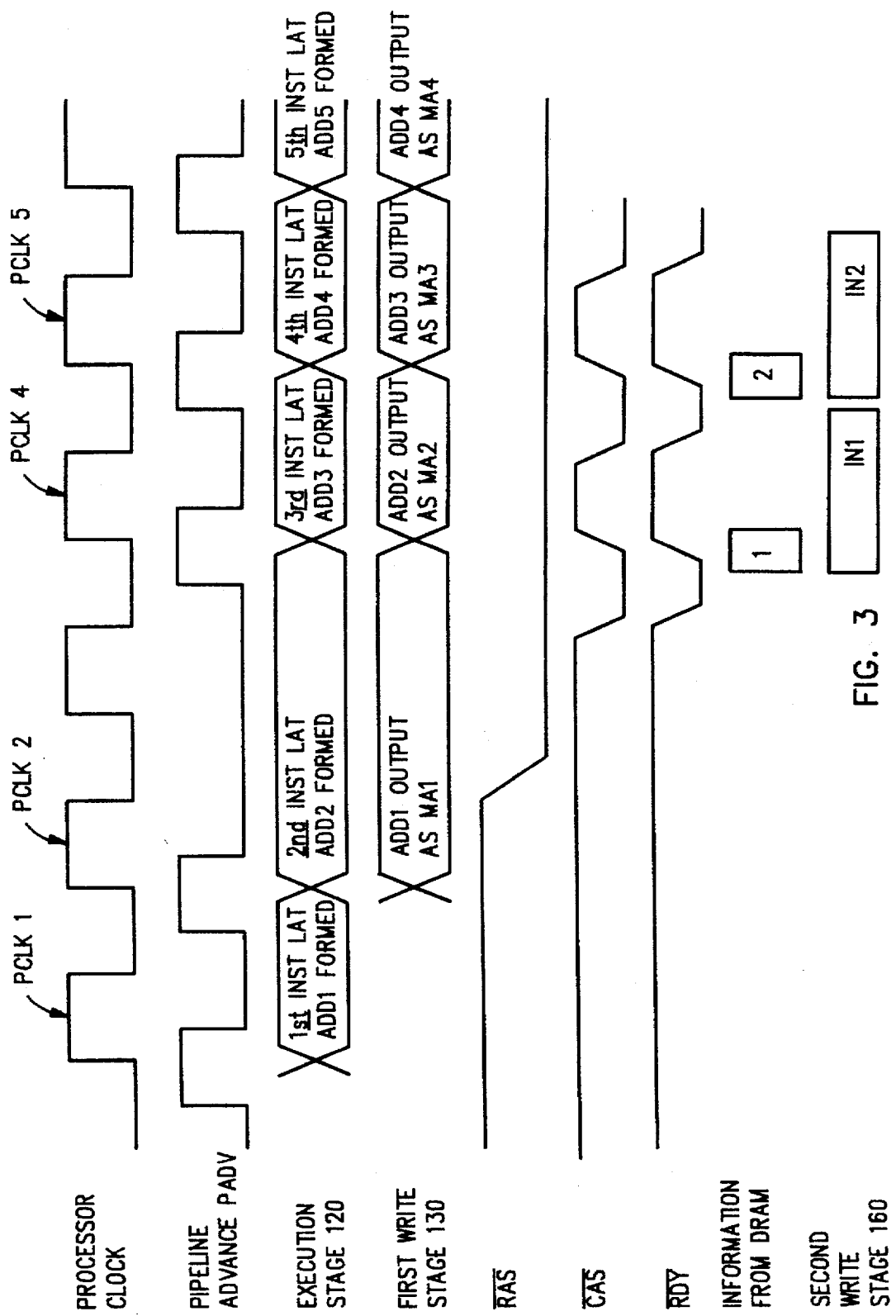
FIG. 3 is a timing diagram illustrating the operation of circuit 100 during a series of read operations.

FIG. 3 shows a timing diagram that illustrates the operation of controller 100 during a series of read operations. As shown in FIG. 3, a first DRAM read instruction is latched by execution stage 120 on the rising edge of a first processor clock pulse PCLK1 when the pipeline advance signal PADV is asserted. Once latched, the address ADD1 associated with the first instruction is calculated by execution stage 120 during the first clock period.

Following this, a second DRAM read instruction is latched by execution stage 120 on the rising edge of a second processor clock pulse PCLK2 when the pipeline advance signal PADV is asserted, while address ADD1 is latched as memory address MA1 by first write stage 130. In addition, once the second instruction is latched, the address ADD2 associated with the second instruction is calculated by execution stage 120 during the second clock period.

When memory address MA1 is within the DRAM address space, but is to a different page of memory, DRAM controller 140 drives a row address strobe RAS to a logic high, thereby indicating that the row address is invalid. (Controller 140 also drives the row address strobe high in response to refresh cycle and excessive RAS low indications).

As further shown in FIG. 3, after being driven high, the row address strobe RAS is held high for approximately one and a half processor clock cycles. (The amount of time that the row address strobe RAS must be held high is defined by the DRAM specification).

Once the row address strobe RAS falls, DRAM controller 140 drives a column address strobe CAS to a logic low, which indicates that the column address is valid, approximately one processor clock cycle later. (The amount of time that the column address strobe CAS must be held high following the lowering of the row address strobe RAS is also defined by the DRAM specification). Once the column address strobe CAS is lowered, the information output from the DRAM becomes valid a delay time later.

The ready signal RDY, in turn, indicates to second write stage 160 and global controller 170 that the information associated with memory address MA1 will be valid during the next clock period.

In addition, global controller 170 sets the logic state of the pipeline advance signal PADV to the predetermined logic state in response to the ready signal RDY, thereby indicating that the instructions in the pipe can be advanced to the next stage in the pipe. As a result, execution stage 120 latches a third instruction on the rising edge of a fourth clock pulse PCLK4, while first write stage 130 latches the second internal address IADD2 as memory address MA2. In addition, second write stage 160 latches the information associated with the first memory address MA1 output from DRAM controller 140 as DRAM information IN1, and directs the information IN1 to one of the register files. As stated above, if the information IN1 is required by the next instruction, second write stage 160 also directs the information IN1 to the ALU.

Thus, in accordance with the present invention, by providing an early ready signal RDY, i.e., by driving the ready signal RDY low, global controller 170 can advance the pipe one cycle early because the information output from the addressed DRAM will be available on the next clock cycle. Therefore, regardless of how many clock cycles are conventionally required to complete a memory request, the present invention allows the request to be completed one clock cycle earlier.

Referring again to FIG. 3, when the second memory address MA2 is to the same page of memory as the first memory address MA1, the column address strobe CAS is dropped again just prior to the falling edge of the fourth processor clock period PCLK4. The information associated with the second memory address MA2 is then latched by second write stage 160 during the fifth clock period as input information IN2.

Thus, in accordance with the present invention, when each memory address relates to the same page of memory as the last memory address, and the row address remains valid, information is read from memory one clock cycle after the address is output. As a result, the present invention allows information to be retrieved from an external memory in the same amount of time that information can be retrieved from a cache memory.

With respect to writing information to an external memory, the present invention allows information to be written during the same clock cycle that the associated memory address is output by first write stage 130 when the address relates to the same page of memory, and the row address remains valid.

Figure 4:
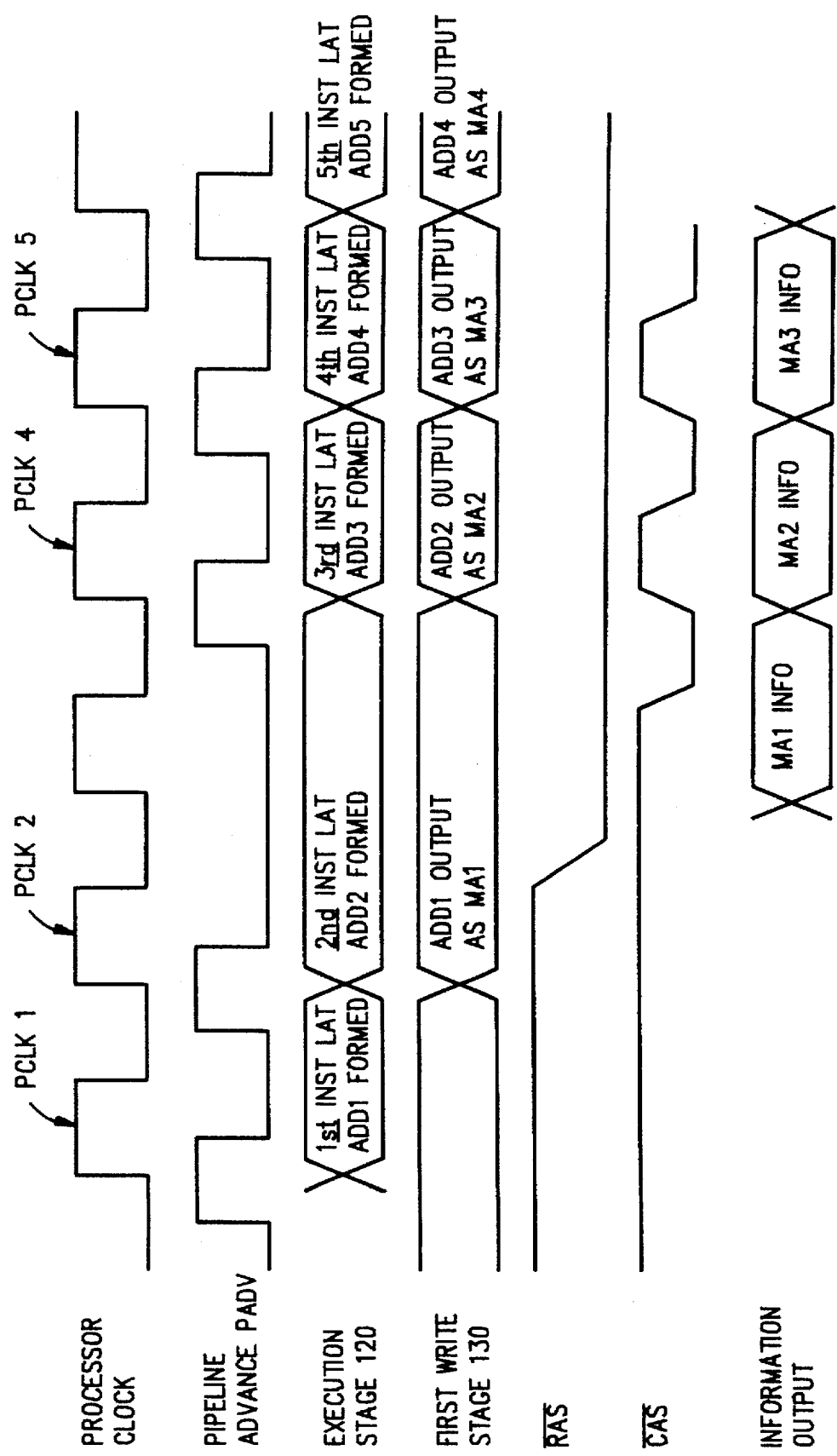
FIG. 4 is a timing diagram illustrating the operation of controller 100 during a series of write operations.

FIG. 4 shows a timing diagram that illustrates the operation of controller 100 during a series of write operations. As shown in FIG. 4, information is written to a DRAM in the same way that information is read from a DRAM except that the information is latched by the DRAM when the column address strobe CAS is lowered.

Figure 5:
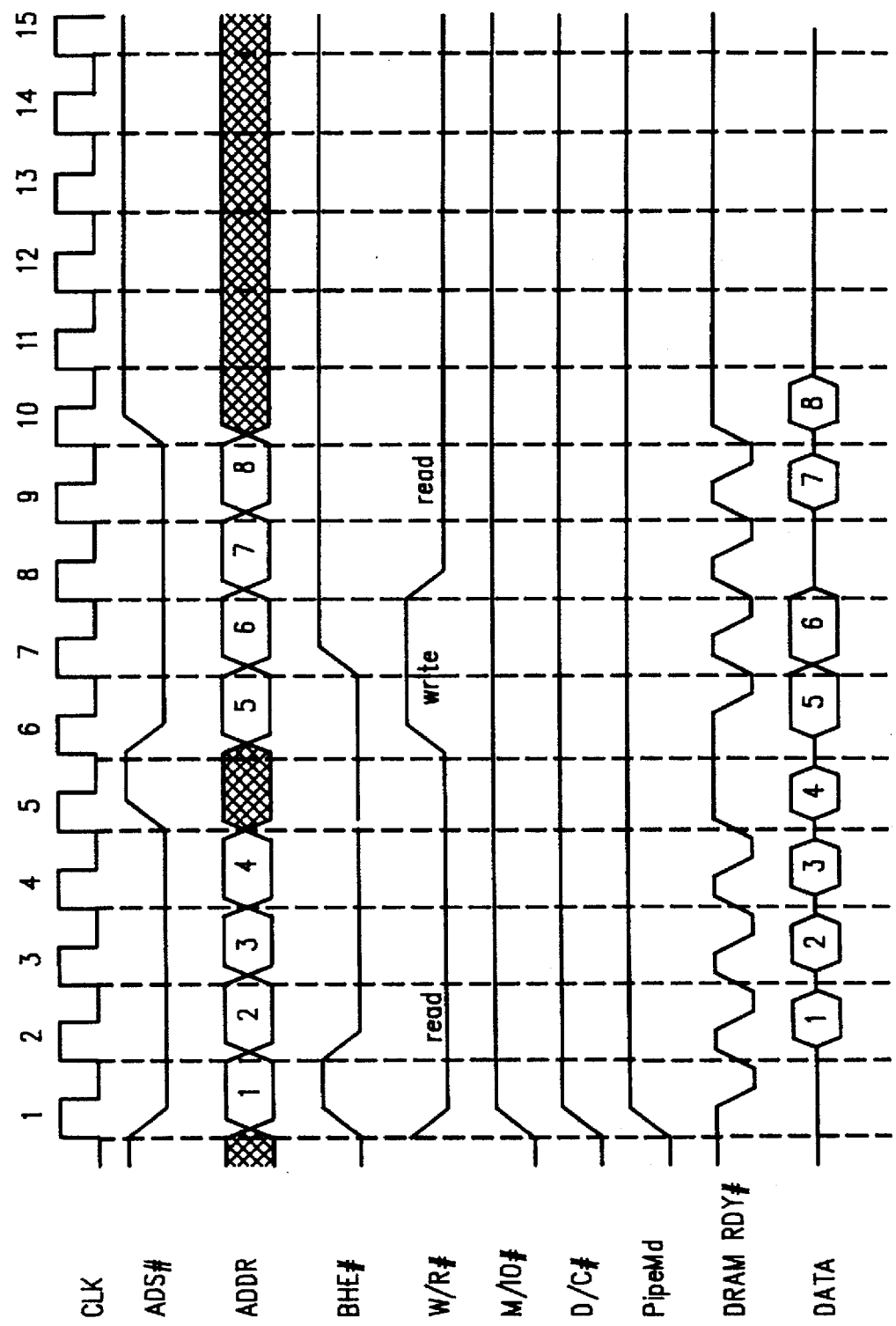
FIG. 5 is a timing diagram illustrating the operation of controller 100 during a combination of read and write operations.

FIG. 5 shows a timing diagram that illustrates the operation of memory access circuit 100 during a combination of read and write operations. As shown in FIG. 5, read and write requests can occur at a rate of one request per cycle. In addition, a one cycle gap is required between read and write requests to avoid a collision on the data bus.

In accordance with the present invention, in addition to pipelining memory requests output from execution stage 120, circuit 100 can also pipeline memory requests from a prefetch stage. When memory requests are pipelined from the prefetch stage, first write stage 130 includes a multiplexer that passes either the address and control signals output from the execution stage, or the address and control signals output from the prefetch stage.

As stated above, in addition to the ready signal RDY, a plurality of pipeline control signals are utilized by global controller 170 to determine when the instructions in the pipe are to be advanced. The pipeline control signals, in turn, include double word and misaligned byte signals.

In the FIG. 2 embodiment, two bytes of information are associated with each memory address. Thus, a double word signal indicates that the information associated with two successive memory locations is requested. On the other hand, the misaligned byte signal indicates when the word of information includes one byte from one address and one byte from another address.

When the execution stage or the prefetch stage output a double word or a misaligned byte signal, global controller 170 ignores the first ready signal, and advances the pipe in response to the second ready signal.

The invention embodiments described herein have been implemented in an integrated circuit which includes a number of additional functions and features which are described in the following co-pending, commonly assigned patent applications, the disclosure of each of which is incorporated herein by reference: U.S. patent application Ser. No. 08/451,319, entitled "DISPLAY CONTROLLER CAPABLE OF ACCESSING AN EXTERNAL MEMORY FOR GRAY SCALE MODULATION DATA" (atty. docket no. NSC1-62700); U.S. patent application Ser. No. 08/451,965, entitled "SERIAL INTERFACE CAPABLE OF OPERATING IN TWO DIFFERENT SERIAL DATA TRANSFER MODES" (atty. docket no. NSC1-62800); U.S. patent application Ser. No. 08/453,076, now abandoned, entitled "HIGH PERFORMANCE MULTIFUNCTION DIRECT MEMORY ACCESS (DMA) CONTROLLER" (atty. docket no. NSC1-62900); U.S. patent application Ser. No. 08/452,001, now abandoned, entitled "OPEN DRAIN MULTI-SOURCE CLOCK GENERATOR HAVING MINIMUM PULSE WIDTH" (atty. docket no. NSC1-63000); U.S. patent application Ser. No. 08/451,503, now abandoned, entitled "INTEGRATED CIRCUIT WITH MULTIPLE FUNCTIONS SHARING MULTIPLE INTERNAL SIGNAL BUSES ACCORDING TO DISTRIBUTED BUS ACCESS AND CONTROL ARBITRATION" (atty. docket no. NSC1-63100); U.S. Pat. No. 5,655,139, entitled "EXECUTION UNIT ARCHITECTURE TO SUPPORT x86 INSTRUCTION SET AND x86 SEGMENTED ADDRESSING" (atty. docket no. NSC1-63300); U.S. Pat. No. 5,652,718, entitled "BARREL SHIFTER" (atty. docket no. NSC1-63400); U.S. patent application Ser. No. 08/451,204, entitled "BIT SEARCHING THROUGH 8, 16, OR 32-BIT OPERANDS USING A 32-BIT DATA PATH" (atty. docket no. NSC1-63500); U.S. patent application Ser. No. 08/451,195, entitled "DOUBLE PRECISION (64-BIT) SHIFT OPERATIONS USING A 32-BIT DATA PATH" (atty. docket no. NSC1-63600); U.S. patent application Ser. No. 08/451,571, entitled "METHOD FOR PERFORMING SIGNED DIVISION" (atty. docket no. NSC1-63700); U.S. patent application Ser. No. 08/452,162, entitled "METHOD FOR PERFORMING ROTATE THROUGH CARRY USING A 32-BIT BARREL SHIFTER AND COUNTER" (atty. docket no. NSC1-63800); U.S. patent application Ser. No. 08/451,434, entitled "AREA AND TIME EFFICIENT FIELD EXTRACTION CIRCUIT" (atty. docket no. NSC1-63900); U.S. Pat. No. 5,677,543, entitled "NON-ARITHMETICAL CIRCULAR BUFFER CELL AVAILABILITY STATUS INDICATOR CIRCUIT" (atty. docket no. NSC1-64000); U.S. patent application Ser. No. 08/445,563, entitled "TAGGED PREFETCH AND INSTRUCTION DECODER FOR VARIABLE LENGTH INSTRUCTION SET AND METHOD OF OPERATION" (atty. docket no. NSC1-64100); U.S. Pat. No. 5,546,353, entitled "PARTITIONED DECODER CIRCUIT FOR LOW POWER OPERATION" (atty. docket no. NSC1-64200); U.S. patent application Ser. No. 08/451,495, entitled "CIRCUIT FOR DESIGNATING INSTRUCTION POINTERS FOR USE BY A PROCESSOR DECODER" (atty. docket no. NSC1-64300); U.S. Pat. No. 5,598,112, entitled "CIRCUIT FOR GENERATING A DEMAND-BASED GATED CLOCK" (atty. docket no.

NSC1-64500); U.S. Pat. No. 5,583,453, entitled "INCREMENTOR/DECREMENTOR" (atty. docket no. NSC1-64700); (atty. docket no. NSC1-64800); U.S. patent application Ser. No. 08/451,198, entitled "CODE BREAKPOINT DECODER" (atty. docket no. NSC1-64900); U.S. Pat. No. 5,680,564, entitled "TWO TIER PREFETCH BUFFER STRUCTURE AND METHOD WITH BYPASS" (atty. docket no. NSC1-65000); U.S. patent application Ser. No. 08/445,564, entitled "INSTRUCTION LIMIT CHECK FOR MICROPROCESSOR" (atty. docket no. NSC1-65100); U.S. patent application Ser. No. 08/452,306, now abandoned, entitled "A PIPELINED MICROPROCESSOR THAT MAKES MEMORY REQUESTS TO A CACHE MEMORY AND AN EXTERNAL MEMORY CONTROLLER DURING THE SAME CLOCK CYCLE" (atty. docket no. NSC1-65200); U.S. patent application Ser. No. 08/452,080, now abandoned, entitled "APPARATUS AND METHOD FOR EFFICIENT COMPUTATION OF A 486™ MICROPROCESSOR COMPATIBLE POP INSTRUCTION" (atty. docket no. NSC1-65700); U.S. patent application Ser. No. 08/450,154, entitled "APPARATUS AND METHOD FOR EFFICIENTLY DETERMINING ADDRESSES FOR MISALIGNED DATA STORED IN MEMORY" (atty. docket no. NSC1-65800); U.S. patent application Ser. No. 08/451,742, entitled "METHOD OF IMPLEMENTING FAST 486™ MICROPROCESSOR COMPATIBLE STRING OPERATION" (atty. docket no. NSC1-65900); U.S. Pat. No. 5,659,712, entitled "A PIPELINED MICROPROCESSOR THAT PREVENTS THE CACHE FROM BEING READ WHEN THE CONTENTS OF THE CACHE ARE INVALID" (atty. docket no. NSC1-66000); U.S. patent application Ser. No. 08/451,507, entitled "DRAM CONTROLLER THAT REDUCES THE TIME REQUIRED TO PROCESS MEMORY REQUESTS" (atty. docket no. NSC1-66300); U.S. patent application Ser. No. 08/451,420, entitled "INTEGRATED PRIMARY BUS AND SECONDARY BUS CONTROLLER WITH REDUCED PIN COUNT" (atty. docket no. NSC1-66400); U.S. Pat. No. 5,612,637, entitled "SUPPLY AND INTERFACE CONFIGURABLE INPUT/OUTPUT BUFFER" (atty. docket no. NSC1-66500); U.S. patent application Ser. No. 08/451,744, entitled "CLOCK GENERATION CIRCUIT FOR A DISPLAY CONTROLLER HAVING A FINE TUNEABLE FRAME RATE" (atty. docket no. NSC1-66600); U.S. patent application Ser. No. 08/451,206, entitled "CONFIGURABLE POWER MANAGEMENT SCHEME" (atty. docket no. NSC1-66700); U.S. patent application Ser. No. 08/452,350, entitled "BIDIRECTIONAL PARALLEL SIGNAL INTERFACE" (atty. docket no. NSC1-67000); U.S. patent application Ser. No. 08/452,094, entitled "LIQUID CRYSTAL DISPLAY (LCD) PROTECTION CIRCUIT" (atty. docket no. NSC1-67100); U.S. patent application Ser. No. 08/450,156, entitled "DISPLAY CONTROLLER CAPABLE OF ACCESSING GRAPHICS DATA FROM A SHARED SYSTEM MEMORY" (atty. docket no. NSC1-67500); U.S. Pat. No. 5,541,935, entitled "INTEGRATED CIRCUIT WITH TEST SIGNAL BUSES AND TEST CONTROL CIRCUITS" (atty. docket no. NSC1-67600); U.S. patent application Ser. No. 08/445,568, entitled "DECODE BLOCK TEST METHOD AND APPARATUS" (atty. docket no. NSC1-68000).

It should be understood that various alternatives to the embodiment of the invention described herein may be employed in practicing the invention. Thus, it is intended that the following claims define the scope of the invention and that methods and structures within the scope of these claims and their equivalents be covered thereby.

What is claimed is:

1. A memory access circuit for pipelining memory requests, the circuit comprising:
   a pipelined processor having a plurality of stages that simultaneously process a plurality of instructions;
   an external memory connected to the pipelined processor; and
   a memory controller connected to the pipelined processor and the external memory, the memory controller receiving a memory request from the pipelined processor, controlling the external memory to output information associated with the memory request when the information is held by the external memory, and asserting an early ready signal during a clock period that precedes a clock period where the information output from the external memory is valid, the early ready signal indicating that the information output from the external memory is valid during a next clock period,
   the pipelined processor including a global controller connected to the stages and the memory controller that asserts a pipeline advance signal each time all of the instructions in the stages of the processor are to be advanced one step, the global controller asserting the pipeline advance signal during a second clock period when the early ready signal is asserted during a first clock period and a plurality of control signals are set to predefined logic states, the first clock period immediately preceding the second clock period.

2. The memory access circuit of claim 1 wherein the pipelined processor further includes a write back stage connected to the external memory that inputs the information output from the external memory during the second clock period.

3. The memory access circuit of claim 2 wherein the write back stage directs the information input from the external memory to a destination location during the second clock period.

4. The memory access circuit of claim 3 wherein the destination location is an ALU.

5. The memory access circuit of claim 3 wherein the destination location is a register file.

6. The memory access circuit of claim 3 wherein the external memory is a DRAM.

7. The memory access circuit of claim 1 wherein the memory controller is a dynamic random-access-memory (DRAM) controller.

8. The memory access circuit of claim 1 wherein the memory controller asserts a column assertion of the early ready signal when a double-word request is output from the pipelined processor.

9. The memory access circuit of claim 1 wherein memory request from the pipelined processor include double-word requests, and wherein the global controller ignores a first assertion of the early ready signal when a double-word request is output from the pipelined processor.

10. The memory access circuit of claim 1 wherein memory requests from the pipelined processor include misaligned-word requests, and wherein the global controller ignores a first assertion of the early ready signal when a misaligned-word request is output from the pipelined processor.

11. The memory access circuit of claim 1 wherein the memory controller determines whether information associated with the memory request is stored in the external memory, outputs a column address strobe (CAS) during a same clock cycle that the memory request was received if the memory request is to a same page of memory as a previous memory request and a previous row address is valid, and outputs an not-this memory signal if the information associated with the memory request is not stored in the external memory.

12. A memory access circuit for pipelining memory requests, the circuit comprising:

a pipelined processor having a plurality of stages that simultaneously process a plurality of instructions;

an external memory connected to the pipelined processor; and a memory controller connected to the pipelined processor and the external memory, the memory controller receiving a memory request from the pipelined processor, controlling the external memory to output information associated with the memory request when the information is held by the external memory, and asserting an early ready signal during a clock period that precedes a clock period where the information output from the external memory is valid, the early ready signal indicating that the information output from the external memory is valid during a next clock period, the pipelined processor including an execution stage that inputs a first instruction during a first clock period, a second instruction during a second clock period, and a third instruction during a third clock period when instructions are advanced one step through the processor during each clock period, and outputs first, second, and third internal memory requests during the first, second, and third clock periods, respectively, when the first, second, and third instructions require information stored in the external memory;

a write stage that inputs the first and second internal memory requests during the second and third clock periods, respectively, when instructions are advanced one step through the processor during each clock period, and outputs the first and second internal memory requests as first and second external memory requests, respectively, during the second and third clock periods, respectively; and a global controller connected to the stages and the memory controller that asserts a pipeline advance signal each time all of the instructions in the stages of the processor are to be advanced one step, the global controller asserting the pipeline advance signal during the third clock period when the early ready signal is asserted during the second clock period and a plurality of control signals are set in predefined logic states, wherein the memory controller receives the first memory request during the second clock period, determines whether information associated with the first external memory request is stored in the external memory, outputs control signals to output the information from the external memory when the information is stored in external memory, asserts the early ready signal during the second clock period when the control signals are output, the first external memory request is to a same page of memory as a previous memory request, a previous row address is valid, and the external memory outputs information in a clock period following the second clock period where the control signals are output.

13. A method for pipelining memory requests, the method comprising the steps of:

receiving a memory request from a pipelined processor having a plurality of stages;

controlling an external memory to output information associated with the memory request when the information is held by the external memory;

asserting an early ready signal one clock period before the information output from the external memory is valid, the early ready signal indicating that the information output from the external memory is valid during a next clock period; and asserting a pipeline advance signal during a second clock period when the early ready signal is asserted during a first clock period and a plurality of control signals are set in predefined logic states, the first clock period immediately preceding the second clock period, the pipeline advance signal being asserted each time instructions are to be advanced one step through the stages of the processor.

14. The method of claim 13 and further comprising the step of inputting the information output from the external memory to the processor during the second clock period.

15. The method of claim 14 wherein the information input from the external memory to the processor is directed to a destination location during the second clock period.

16. The method of claim 15 wherein the destination location is an ALU.

17. The method of claim 15 wherein the destination location is a register file.

18. The method of claim 13 and further comprising the steps of:

ignoring a first assertion of the early ready signal when a double-word memory request is output from the pipelined processor; and ignoring a first assertion of the early ready signal when a misaligned word memory request is output from the pipelined processor.

* * * * *

UNITED STATES PATENT AND TRADEMARK OFFICE
CERTIFICATE OF CORRECTION

PATENT NO.: 5,752,269
DATED: May 12, 1998
INVENTOR(S): Divivier et al.

It is certified that error appears in the above-identified patent and that said Letters Patent is hereby corrected as shown below:

In Col. 8, Claim 8, lines 48-50, delete "assertion of the early ready signal when a double word request is output from the pipelined processor." and substitute therefor -- address strobe (CAS) and the early ready signal during a same clock period when the external memory outputs information in a clock period following the clock period where the CAS strobe is output.--

In Col. 8, Claim 9, line 52, "request" should be --requests--.

Signed and Sealed this

Twenty-fifth Day of August, 1998

Attest:

BRUCE LEHMAN

*Attesting Officer*  *Commissioner of Patents and Trademarks*